United States Patent [19]

Meyer, III

[11] 4,303,233

[45] Dec. 1, 1981

[54] HOLDER FOR A WOODEN WORKPIECE

[76] Inventor: Gustave C. Meyer, III, Box 224, St. Peters, Pa. 19470

[21] Appl. No.: 164,494

[22] Filed: Jul. 2, 1980

[51] Int. Cl.³ ................................ B23Q 1/00

[52] U.S. Cl. ................................ 269/54.5; 269/102

[58] Field of Search ................................ 269/53–54.5, 269/102; 254/104; 144/193 E, 193 R; 142/53, 55–57; 29/283, 275; 145/46, 1 R; 248/218.3, 216.1, 217.3

[56] References Cited

U.S. PATENT DOCUMENTS

| | | | |
|---|---|---|---|
| 443,581 | 12/1890 | Marshall | 254/104 |
| 797,083 | 8/1905 | Stowe | 248/217.3 X |
| 981,548 | 1/1911 | Genvit | 145/46 |
| 1,631,827 | 6/1927 | Lantagne | 269/54.4 |
| 1,876,021 | 9/1932 | Quigley | 29/275 X |
| 2,089,902 | 8/1937 | Kulp | 29/275 X |
| 2,176,149 | 10/1939 | Redfern et al. | 269/102 X |
| 2,580,948 | 1/1952 | Pancake | 29/275 |
| 4,184,840 | 1/1980 | Gamberg et al. | 269/54.5 X |
| 4,212,698 | 7/1980 | Blair | 269/54.4 X |

*Primary Examiner*—Robert C. Watson
*Attorney, Agent, or Firm*—Woodcock, Washburn, Kurtz, Mackiewicz & Norris

[57] ABSTRACT

An improved holder for a wooden workpiece is provided which comprises a first spike for impalement of a wooden workpiece, such as a log to be split, a second spike for insertion into a massive wooden member such a stump, and an anvil for driving the second spike into the stump. In a preferred embodiment, both first and second spikes and the anvil are formed as a unit by casting from metal. The spike for insertion into the stump may be provided with barbs or other apparatus for affixing the workpiece holder firmly to the stump.

1 Claim, 3 Drawing Figures

HOLDER FOR A WOODEN WORKPIECE

FIELD OF THE INVENTION

This invention relates to the field of holding workpieces. More particularly, the invention relates to a holder for a wooden workpiece, specifically a log to be split.

BACKGROUND OF THE INVENTION

With the recent rise in popularity of wood as a fuel for the heating of homes, there has been an increasing profusion of devices made available for the splitting of logs of wood into more conveniently sized pieces for burning. Among devices of this class are four-bladed, splitting wedge tools such as described in my U.S. Pat. No. 4,175,601. Since the splitting typically requires both hands, it is desirable that a wood holding device be provided. Some of the wedge tools which have been recently developed include means for holding the log still while it is being split but none of these are efficient splitting tools. Clearly, such a holding device to be useful would be inexpensively manufactured, readily useful with a wide variety of wooden workpieces, substantially fool-proof, and durable in service.

OBJECT OF THE INVENTION

It is therefore an object of the invention to provide an improved holder for a wooden workpiece.

A further object of the invention is to provide a wooden workpiece holder which is readily and inexpensively manufacturable, but which is durable in service and easy to use.

SUMMARY OF THE INVENTION

The present invention satisfies the needs of the art and the objects of the invention mentioned above by its provision of a holder for a wooden workpiece which comprises an upwardly pointing spike for the holding of wood, formed integrally with one or more downwardly extending spikes for permanent insertion in a stump or massive wooden member. The workpiece to be split can then be impaled upon the upwardly extending spike and will be held by the friction between the upwardly extending spike and the wooden workpiece to be split leaving both hands of the splitter free to manipulate the wedge device and sledge-hammer usually employed to split wood.

BRIEF DESCRIPTION OF THE DRAWINGS

The invention will be better understood if reference is made to the accompanying drawings in which.

DESCRIPTION OF THE PREFERRED EMBODIMENTS

Figure 1:
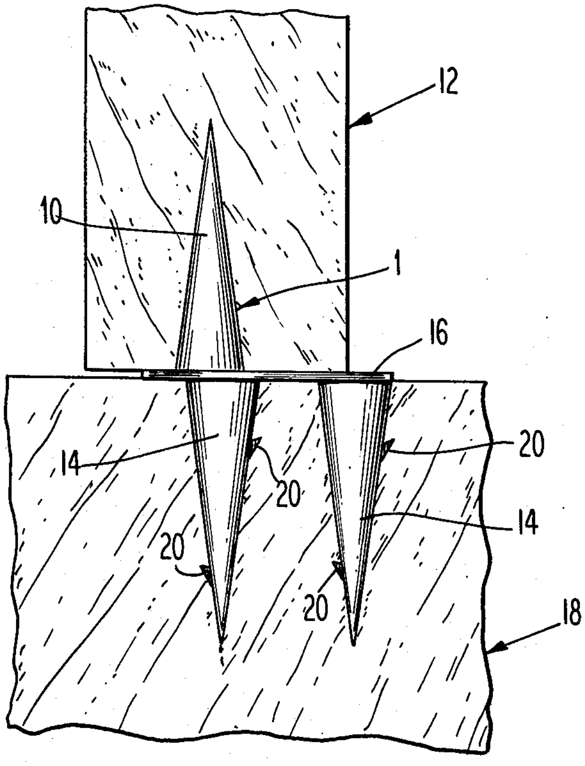
FIG. 1 represents a first embodiment of the invention showing the workpiece holder embedded in a stump or other massive wooden member and having a workpiece impaled thereon.

Referring now to FIG. 1, the workpiece holder according to the invention 1 is shown comprising a first upwardly extending spike 10, on which is impaled a workpiece to be split 12, a pair of downwardly extending spikes 14 and an intermediate connecting substantially planar anvil surface 16. The anvil surface 16 is provided as a hammering surface whereby one desiring to anchor the workpiece holder of the invention in a stump or other massive wooden member 18 is provided with an anvil on which to strike the workpiece holder of the invention 1 so as to drive the downwardly extending spikes 14 into the stump 18 for permanent mounting of the workpiece holder 1 of the invention therein. It will be noted that the downwardly extending spikes 14 comprise a plurality of barbs 20 to ensure that the holder 1 remains firmly fixed in the stump 18. It will be appreciated that the relative proportions and shapes of the upwardly and downwardly extending spikes and the anvil 16 can vary greatly; in a presently preferred embodiment the upwardly extending spike is substantially cylindrical in shape, on the order of 6 mm in diameter, much as a large nail or spike. Moreover, it will be appreciated that while the wooden workpiece holder is shown as being generally unitary, e.g., as formed by forging or casting in a single piece, it would be possible to manufacture it in several pieces. For example, the anvil 16 could be a heavy metal plate having holes formed therein for the insertion of nails essentially to perform the functions of the upwardly and downwardly extending spikes 10 and 14, respectively.

Figure 2:
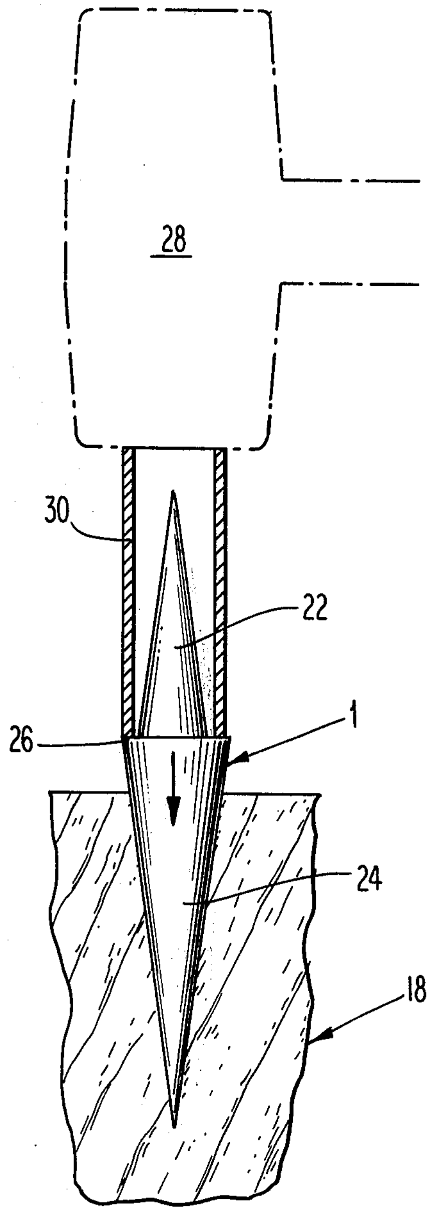
FIG. 2 shows a second embodiment of the invention being inserted into a stump or other massive wooden member for permanent mounting therein.

A second embodiment of the wooden workpiece holder 1 of the invention, having a single upwardly extending spike 22 and a single downwardly extending spike 24, is shown in FIG. 2. There it is not convenient to provide a large anvil; instead the unitary workpiece holder 1 is formed to comprise a circular striking surface 26. The circular striking surface 26 can then be struck by a sledge or mallet (shown in phantom at 28) by provision of a cylindrical piece of metal pipe or the like for mating with the circular anvil 26. As noted in FIG. 2, the downwardly extending spike 24 is made larger (with a correspondingly larger surface area) than the upwardly extending spike 22 so that if, for example, a log is impaled upon the upwardly extending spike 22 but cannot be split for some reason it can be removed therefrom without running the risk that the downwardly extending spike 24 is removed instead from the log or other massive wooden member 18.

Figure 3:
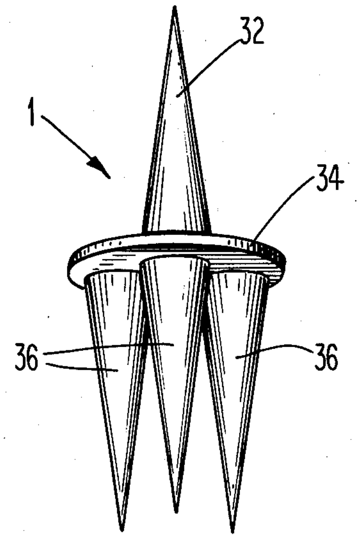
FIG. 3 shows a third embodiment of the wooden workpiece holder of the invention.

FIG. 3 shows a further possible embodiment of the workpiece holder 1 of the invention in which a single upwardly extending spike 32 is mated, by means of a large circular anvil 34, to three downwardly extending spikes 36. As shown, the anvil may be somewhat larger in circumference than the outer-most portions of the downwardly extending spikes 36; again, the shapes and proportions of the various portions of the workpiece holder can be modified to suit the needs of a particular application. Moreover, as in the cases of the embodiments shown in FIGS. 1 and 2, that of FIG. 3 can be modified by making all the spikes of a more generally cylindrical shape than the conical shape shown in the figures. Furthermore, the holder for a wooden workpiece of the invention shown in FIG. 3, as is the case with the embodiments shown in FIGS. 1 and 2, can be made as a unitary metal structure by, e.g., casting or forging or can be assembled from a number of individual parts.

Finally, the workpiece holder of the invention may be supplied with a safety cap for covering the upwardly extending spike when not in use; means may be provided to fix the cap to the workpiece holder so as to avoid detachment by children and those not capable of using the workpiece holder of the invention safely.

It will be appreciated accordingly that there are numerous modifications and improvements which can be made to the holder for a wooden workpiece of the invention without departing from its spirit and scope which is as defined by the following claims.

What is claimed is:

1. In combination:

a workpiece holder, comprising a first substantially elongated spike of circular cross-section for impalement of a workpiece thereon, a generally elongated second spike of circular cross-section substantially coaxially aligned with said first spike for penetration into a massive wooden member for holding said workpiece holder, and an anvil comprising a ringlike surface concentric with and perpendicular to the common axis of said first and second spikes, disposed substantially symmetrically around the common axis of said first and second spikes for receiving impacts to drive said second spike into said massive wooden member; and a means for mating with said anvil and for transmitting impacts to said anvil.

* * * * *